Oct. 9, 1945.  J. P. LAIKAM  2,386,559
PLOW
Filed Sept. 14, 1944  2 Sheets-Sheet 1

Inventor

John Peter Laikam

By Clarence A. O'Brien
and Harvey B. Jacobson
Attorneys

Oct. 9, 1945.  J. P. LAIKAM  2,386,559
PLOW
Filed Sept. 14, 1944   2 Sheets-Sheet 2
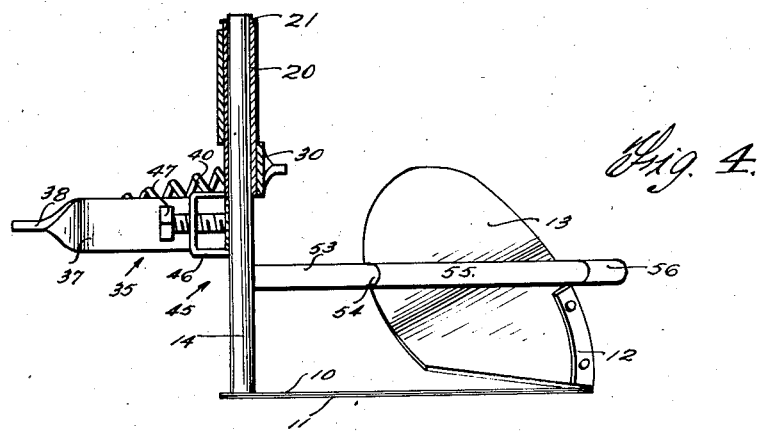
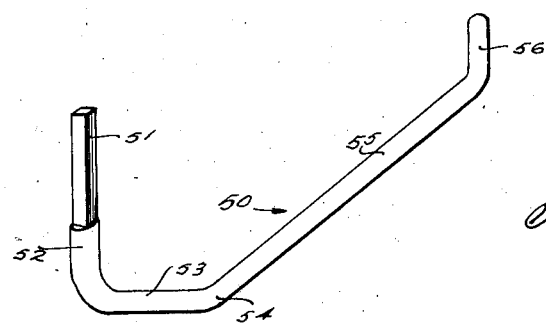
Inventor
John Peter Laikam
By *Clarence A. O'Brien
and Harvey B. Jacobson*
Attorneys Patented Oct. 9, 1945

2,386,559

UNITED STATES PATENT OFFICE 2,386,559

PLOW

John Peter Laikam, Fowler, Calif.

Application September 14, 1944, Serial No. 554,071

1 Claim. (Cl. 97—137)

This invention relates to a plow, and more particularly to such a plow adapted to plow around and between trees or other obstacles.

A primary object of this invention is the provision of an improved plow adapted for use in congested sectors, as along the edge of a field bordered by trees or posts or the like, having automatic means to deflect the same when an obstacle is reached.

A further object is the provision in such a plow of means for returning the same to plowing position and in its previous alignment subsequent to such deflection by an obstacle.

A still further object is the provision of such a plow which may be readily and simply attached to a gang plow or the like in order that the edge or border of a field may be plowed simultaneously with the last furrows to be plowed therein.

Other objects reside in the combinations of elements, arrangements of parts, and features of construction, all as will be more fully pointed out hereinafter, and shown in the accompanying drawings, wherein there is disclosed a preferred embodiment of this inventive concept.

In the drawings:

Figure 4 is an enlarged sectional view taken substantially along the line 4—4 of Figure 1, and Figure 5 is an enlarged perspective view of a constructional element of the device.

Like reference numerals refer to like parts throughout the several views of the drawings.

Figure 1:
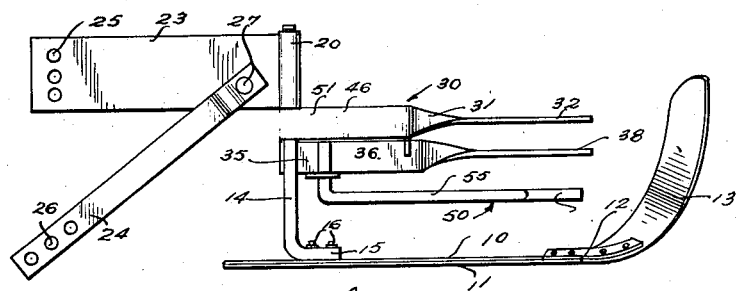
Figure 1 is a side elevational view of one form of plow incorporating features of this invention.
Figure 2:
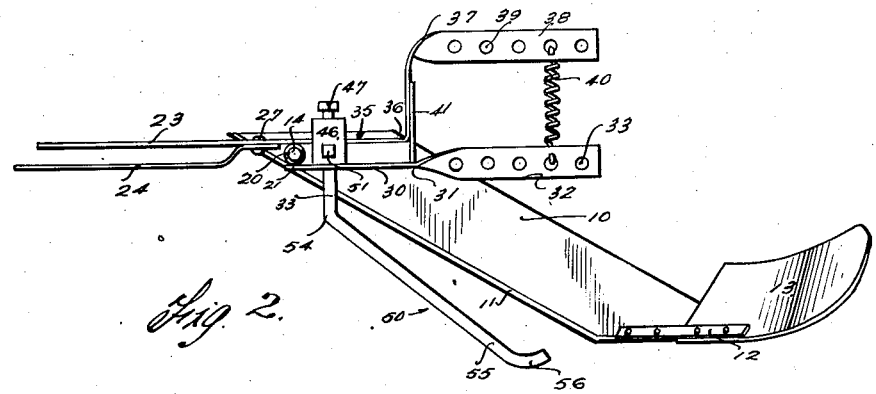
Figure 2 is a top plan view of the plow of Figure 1.
Figure 3:
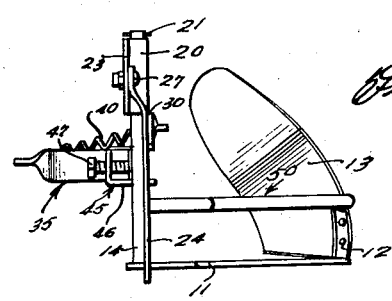
Figure 3 is a front elevational view of the plow shown in Figures 1 and 2.

Having reference now to the drawings, there is shown at 10 a plow blade provided with a cutting edge 11 and having secured to an end thereof a retaining strip 12 to which is, in turn, secured a mold board 13.

A cylindrical rod 14 is bent and flattened at its extremity as at 15 and secured as by rivets or bolts 16 to plow blade 10. The upper extremity of rod 14 is journaled in a sleeve 20 and held in position as by a cotter pin 21 or the like passed through a suitable aperture in the upper extremity of the rod. Thus it will be seen that rod 14 and hence plow blade 10 are free to rotate within and with respect to sleeve 20, in a manner and for a purpose to be more fully pointed out hereinafter.

A suitable draw-bar 23 is fixedly secured to sleeve 20, and provided with a tongue or extension 24, suitable apertures 25 and 26 being provided in draw-bar 23 and tongue 24, respectively, to permit ready attachment to any suitable towing vehicle or device. Tongue 24 is secured to draw-bar 23, as by means of a nut and bolt 27, whereby the angular relation of the two parts may be readily varied to accommodate a variety of towing connections.

Also secured to the sleeve 20 and extending rearwardly therefrom, that is, in a direction opposite to the extension of member 23, is a member 30 comprised of sheet metal or the like, and twisted as at 31 to provide a substantially horizontal surface 32 having a plurality of apertures 33 spaced therealong.

A second rearwardly extending member 35 is fixedly secured to post 14 below sleeve 20 and is formed with a right-angled bend 36 and a second bend 37, and terminates in a flat portion 38 having a plurality of apertures 39 therethrough. Thus it will be seen that flattened portion 32 is in substantially parallel alignment with flattened portion 38, but that the two are spaced a substantial distance apart. A tension spring 40 is adapted to be positioned between members 32 and 38, having its ends secured in oppositely disposed holes 33 and 39. A plurality of these holes are provided, in order that the spring may be variously positioned along the length of the members, to vary the tension serving to bias them toward each other, for a purpose to be described hereinafter.

A suitable stop member 41 fixedly secured to member 35 extends into abutting relation with member 30 to preclude the tension spring 40 forcing the same too closely together.

A clamp 45 comprised of a U-shaped member 46 has a suitable threaded aperture passed therethrough in which is positioned a bolt or set screw 47. The legs of clamp 46 are provided with a pair of aligned rectangular apertures, within which is adapted to be positioned the squared end 51 of a guard member generally indicated at 50.

It will thus be seen that U-shaped member 46, which is of a dimension to fit over member 35 is adapted to be held releasably in position thereon by the abutment of squared end 51 on one side of member 35 and the screw or bolt 47 against the other side.

Referring back to guard member 50 it will be seen that the same is comprised of a vertical portion 52 at the upper extremity of which is provided squared end 51 and a horizontally extending portion 53 bent as at 54 at an angle to provide a portion 55 adapted to be positioned, normally, above and slightly in advance of edge 11 of blade 10. An inwardly turned extremity 56 serves as a deflector adjacent the extremity of the plow blade.

From the foregoing the operation of the device should now be readily understandable. The plow is secured as desired by means of draw-bar 23 and tongue 24 to the rear of a single plow, or the last plow in a gang plow, and so positioned as to cut a furrow along the edge of a field, or in a similar position where there are roots, grass or other obstacles. As the plow is towed the blade 11 serves effectively to cut any small roots as of grass or the like to prevent their subsequent encroachment into the plowed area, mold board 13 serving to turn the earth in conventional manner. However, when an obstacle of major proportion is reached, it is first met by guard bar 50 which is forced inwardly and rearwardly, causing, through its connection to post 14, rotative movement of post 14 within sleeve 20, and consequent deflection of blade 10 away from the obstacle. Such movement causes corresponding deflection of member 35 away from member 30. However, when the obstacle is passed and pressure is no longer exerted on guard member 50, spring 40 causes members 30 and 35 to reassume their aligned position, which movement causes plow blade 10 to resume its operative position.

As above pointed out, means are provided for varying the tension of spring 40 by adjusting its position along the members 30 and 35. Similarly, the use of set screw 47 in clamp 45 permits adjustment of the height of guard 50 with respect to the blade 10.

From the foregoing it will now be seen that there is herein provided an improved plow, accomplishing all the objects of this device and others, including many advantages of great practical utility and commercial importance.

As many embodiments may be made of this inventive concept, and as many modifications may be made in the embodiment hereinbefore shown and described, it is to be understood that all matter herein is to be interpreted merely as illustrative and not in a limiting sense.

I claim:

A plow attachment comprising a draw bar adapted to be attached to the plow beam of a leading plow, a vertically extending sleeve at the rear end of said draw bar, a bracket extending rearwardly from the sleeve, a rod mounted to rotate in said sleeve, a rearwardly extending bracket fixed to the rod beneath the sleeve, a retractile coil spring extending between the brackets yieldingly to urge them toward one another, a stop to limit the approach of the brackets toward one another, a plow blade carried by the lower end of the rod, a guard bar extending substantially parallel with the leading edge of the plow blade and a clamp supporting the guard bar for longitudinal adjustment on the second mentioned bracket whereby the horizontal distance between the guard bar and blade may be varied to suit varying conditions.

JOHN PETER LAIKAM.